US012245238B2

United States Patent
Huang et al.

(10) Patent No.: US 12,245,238 B2
(45) Date of Patent: Mar. 4, 2025

(54) UPLINK CONTROL INFORMATION MULTIPLEXING

(71) Applicant: QUALCOMM Incorporated, San Diego, CA (US)

(72) Inventors: Yi Huang, San Diego, CA (US); Wanshi Chen, San Diego, CA (US); Peter Gaal, San Diego, CA (US); Tingfang Ji, San Diego, CA (US); Wei Yang, San Diego, CA (US); Gokul Sridharan, Sunnyvale, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/647,273

(22) Filed: Jan. 6, 2022

(65) Prior Publication Data
US 2022/0225381 A1    Jul. 14, 2022

Related U.S. Application Data

(60) Provisional application No. 63/137,009, filed on Jan. 13, 2021.

(51) Int. Cl.
*H04W 72/1263* (2023.01)
*H04L 27/26* (2006.01)
(Continued)

(52) U.S. Cl.
CPC ......... *H04W 72/21* (2023.01); *H04L 27/2607* (2013.01); *H04W 72/1263* (2013.01); *H04W 72/566* (2023.01)

(58) Field of Classification Search
CPC combination set(s) only.
See application file for complete search history.

(56) References Cited

U.S. PATENT DOCUMENTS

| 11,736,259 B2 * | 8/2023 | Nayeb Nazar | H04L 5/0055 370/329 |
| 2021/0195597 A1 * | 6/2021 | Wu | H04L 5/0053 |

(Continued)

OTHER PUBLICATIONS

Huawei, et al., "Short PUCCH for UCI of up to 2 Bits", 3GPP Draft, 3GPP TSG RAN WG1 Meeting AH_NR#3, R1-1715399, 3RD Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017(Sep. 17, 2017), Sep. 9, 2017 (Sep. 9, 2017), XP051328962, XP051338867, 17 Pages, Retrieved from the Internet: URL: http://www.3gpp.org/ftp/Meetings_3GPP_SYNC/RAN1/Docs/ [retrieved on Sep. 17, 2017], http://www.3gpp.org/ftp/Meetings_3GPP_SYNC/RAN1/Docs/[retrieved on Sep. 9, 2017] section 2.3.

(Continued)

*Primary Examiner* — Hanh N Nguyen
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may generate an uplink control information (UCI) message including a scheduling request bit multiplexed with a first UCI bit and a second UCI bit, including: selecting a set of sequences, of a set of candidate sets of sequences, to use for multiplexing the first UCI bit and the second UCI bit, the selection of the set of sequences indicating the scheduling request bit, and multiplexing the first UCI bit and the second UCI bit based at least in part on the set of sequences. The UE may transmit the UCI message. Numerous other aspects are described.

28 Claims, 9 Drawing Sheets

(51) Int. Cl.
H04W 72/21 (2023.01)
H04W 72/566 (2023.01)

(56) References Cited

U.S. PATENT DOCUMENTS

2022/0225324 A1* 7/2022 Huang .................. H04J 13/004
2022/0361199 A1* 11/2022 Yin ....................... H04L 1/1861
2022/0369347 A1 11/2022 Gao et al.

OTHER PUBLICATIONS

Interdigital Inc: "On HARQ-ACK and SR Multiplexing on Short-PUCCH", 3GPP TSG RAN WG1 Meeting 90bis, 3GPP Draft, R1-1718491, On HARQ-ACK and SR Multiplexing on Short-Pucch, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), pp. 1-8, XP051341673, Retrieved from the Internet: URL: http://www.3gpp.org/ftp/Meetings_3GPP_SYNC/RAN1/Docs/ [retrieved on Oct. 8, 2017] the whole document.
International Search Report and Written Opinion—PCT/US2022/070090—ISA/EPO—May 2, 2022.
NTT Docomo Inc: "Short-PUCCH for UCI of up to 2 Bits", 3GPP Draft, R1-1713938, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), pp. 1-16, XP051316730, Retrieved from the Internet: URL:http://www.3gpp.org/ftp/Meetings_3GPP_SYNC/RAN1/Docs/ [retrieved on Aug. 20, 2017] section 2.3.

* cited by examiner

UPLINK CONTROL INFORMATION MULTIPLEXING

CROSS-REFERENCE TO RELATED APPLICATION

This patent application claims priority to U.S. Provisional Patent Application No. 63/137,009, filed on Jan. 13, 2021, entitled "UPLINK CONTROL INFORMATION MULTIPLEXING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for uplink control information multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes generating an uplink control information (UCI) message including a scheduling request bit multiplexed with a first UCI bit and a second UCI bit, including: selecting a set of sequences, of a set of candidate sets of sequences, to use for multiplexing the first UCI bit and the second UCI bit, the selection of the set of sequences indicating the scheduling request bit, and multiplexing the first UCI bit and the second UCI bit based at least in part on the set of sequences; and transmitting the UCI message.

In some aspects, a method of wireless communication performed by a UE includes generating a UCI message including a scheduling request bit multiplexed with a first UCI bit and a second UCI bit, including: selecting a set of cyclic shift indices, of a set of candidate sets of cyclic shift indices, to use for multiplexing the first UCI bit and the second UCI bit, the selection of the set of cyclic shift indices indicating the scheduling request bit, and selecting a cyclic shift index of the set of cyclic shift indices to indicate the first UCI bit and the second UCI bit; and transmitting the UCI message.

In some aspects, a UE for wireless communication includes a memory; and one or more processors coupled to the memory, the one or more processors configured to: generate a UCI message including a scheduling request bit multiplexed with a first UCI bit and a second UCI bit, including: selection of a set of sequences, of a set of candidate sets of sequences, to use for multiplexing the first UCI bit and the second UCI bit, the selection of the set of sequences indicating the scheduling request bit, and multiplexing of the first UCI bit and the second UCI bit based at least in part on the set of sequences; and transmit the UCI message.

In some aspects, a UE for wireless communication includes a memory; and one or more processors coupled to the memory, the one or more processors configured to: generate a UCI message including a scheduling request bit multiplexed with a first UCI bit and a second UCI bit, including: select a set of cyclic shift indices, of a set of candidate sets of cyclic shift indices, to use for multiplexing the first UCI bit and the second UCI bit, the selection of the set of cyclic shift indices indicating the scheduling request bit, and select a cyclic shift index of the set of cyclic shift indices to indicate the first UCI bit and the second UCI bit; and transmit the UCI message.

In some aspects, a non-transitory computer-readable medium storing a set of instructions for wireless communication includes one or more instructions that, when executed by one or more processors of a UE, cause the UE to: generate a UCI message including a scheduling request bit multiplexed with a first UCI bit and a second UCI bit, including: select a set of sequences, of a set of candidate sets of sequences, to use for multiplexing the first UCI bit and the second UCI bit, the selection of the set of sequences indicating the scheduling request bit, and multiplex the first UCI bit and the second UCI bit based at least in part on the set of sequences; and transmit the UCI message.

In some aspects, a non-transitory computer-readable medium storing a set of instructions for wireless communication includes one or more instructions that, when executed by one or more processors of an UE, cause the UE to:

generate a UCI message including a scheduling request bit multiplexed with a first UCI bit and a second UCI bit, including: select a set of cyclic shift indices, of a set of candidate sets of cyclic shift indices, to use for multiplexing the first UCI bit and the second UCI bit, the selection of the set of cyclic shift indices indicating the scheduling request bit, and select a cyclic shift index of the set of cyclic shift indices to indicate the first UCI bit and the second UCI bit; and transmit the UCI message.

In some aspects, an apparatus for wireless communication includes means for generating a UCI message including a scheduling request bit multiplexed with a first UCI bit and a second UCI bit, including: means for selecting a set of sequences, of a set of candidate sets of sequences, to use for multiplexing the first UCI bit and the second UCI bit, the selection of the set of sequences indicating the scheduling request bit, and means for multiplexing the first UCI bit and the second UCI bit based at least in part on the set of sequences; and means for transmitting the UCI message.

In some aspects, an apparatus for wireless communication includes means for generating a UCI message including a scheduling request bit multiplexed with a first UCI bit and a second UCI bit, including: means for selecting a set of cyclic shift indices, of a set of candidate sets of cyclic shift indices, to use for multiplexing the first UCI bit and the second UCI bit, the selection of the set of cyclic shift indices indicating the scheduling request bit, and means for selecting a cyclic shift index of the set of cyclic shift indices to indicate the first UCI bit and the second UCI bit; and means for transmitting the UCI message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
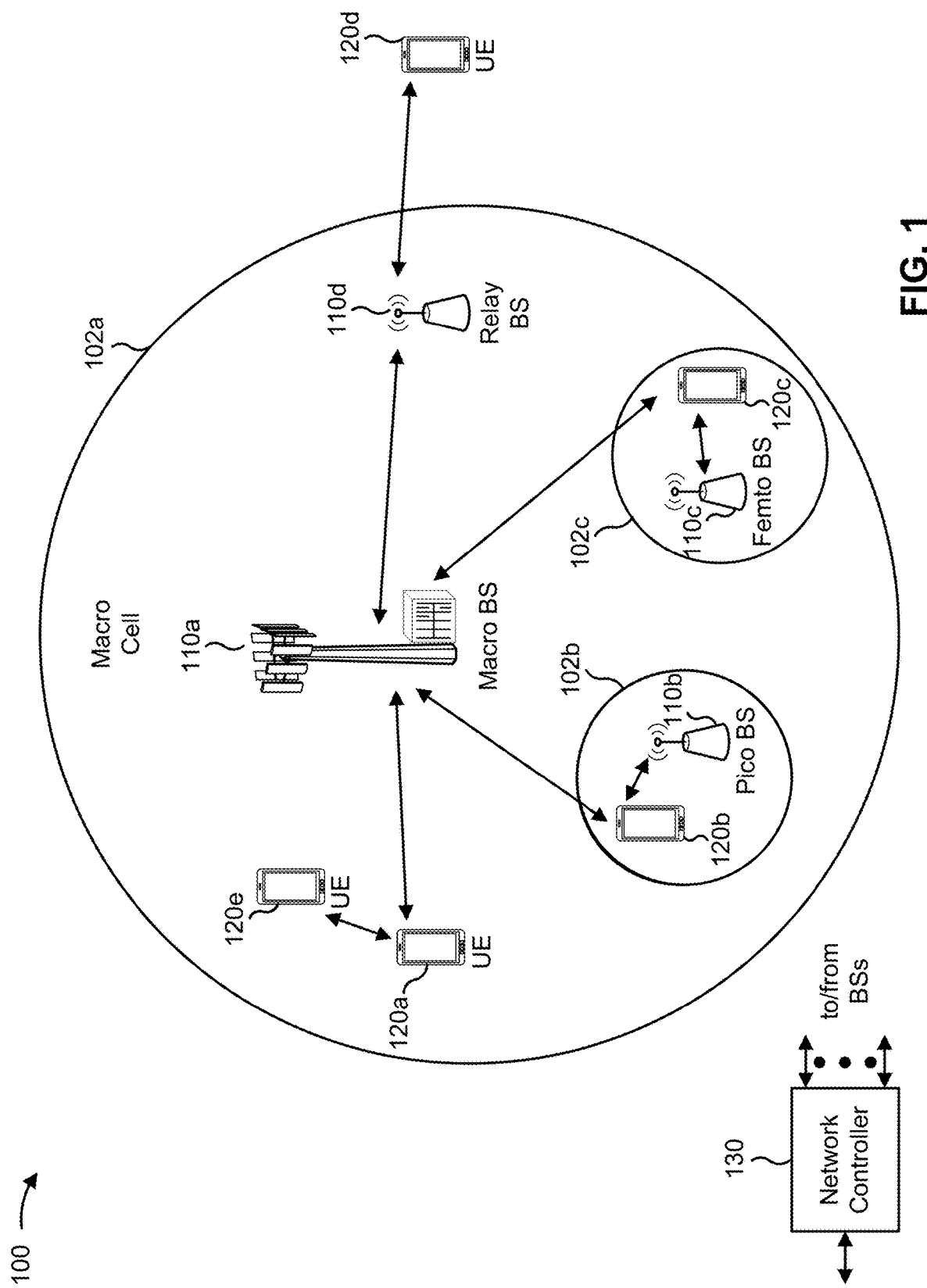
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
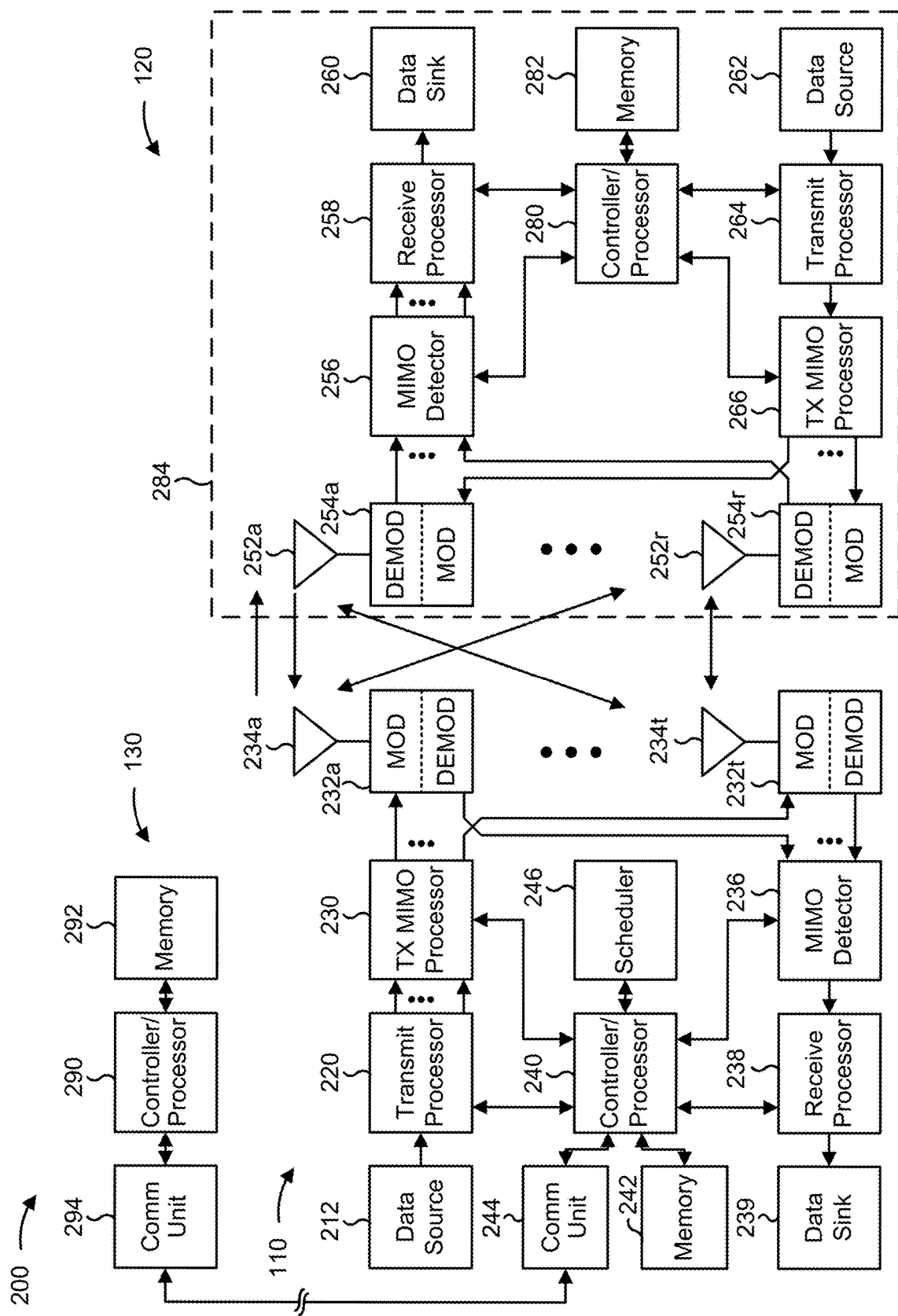
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-9).

Controller/processor 240 of base station 110, controller/processor 280 of UE 120, and/or any other component(s) of FIG. 2 may perform one or more techniques associated with uplink control information multiplexing, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for generating a UCI message including a scheduling request bit multiplexed with a first UCI bit and a second UCI bit, including: means for selecting a set of sequences, of a set of candidate sets of sequences, to use for multiplexing the first UCI bit and the second UCI bit, the selection of the set of sequences indicating the scheduling request bit, and means for multiplexing the first UCI bit and the second UCI bit based at least in part on the set of sequences; or means for transmitting the UCI message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication of the set of candidate sets of sequences from which the set of sequences is to be selected to indicate the scheduling request bit.

In some aspects, the UE includes means for modulating, based at least in part on quadrature phase shift keying (QPSK), a symbol of two bits including the first UCI bit and the second UCI bit.

In some aspects, the UE includes means for combining the second UCI bit, modulated based at least in part QPSK, with the single sequence on even OFDM symbols.

In some aspects, the UE includes means for receiving, from a base station, an indication of the first cyclic shift and the second cyclic shift.

In some aspects, the UE includes means for superimposing the first UCI bit having the first sequence applied with the second UCI bit having the second sequence applied.

In some aspects, the UE includes means for applying a first weight to the first UCI bit having the first sequence applied and applying a second weight to the second UCI bit having the second sequence applied; or means for superimposing the first UCI bit having the first sequence applied, and with the first weight applied, with the second UCI bit having the second sequence applied, and with the second weight applied.

In some aspects, the UE includes means for receiving, from a base station, an indication to apply the first weight to the first UCI bit and to apply the second weight to the second UCI bit.

In some aspects, the UE includes means for selecting a sequence, of the set of sequences, to apply to the second UCI bit, the selection of the sequence indicating the first UCI bit; or means for applying the sequence to the second UCI bit.

In some aspects, the UE includes means for receiving an indication that selection of the sequence from the set of sequences indicates the first UCI bit.

In some aspects, the UE includes means for modulating, based at least in part on binary phase shift keying (BPSK), a symbol of one bit including the second UCI bit.

In some aspects, the UE includes means for combining the second UCI bit, modulated based at least in part BPSK, with the sequence on even OFDM symbols.

In some aspects, the UE includes means for generating a UCI message including a scheduling request bit multiplexed with a first UCI bit and a second UCI bit, including: means for selecting a set of cyclic shift indices, of a set of candidate sets of cyclic shift indices, to use for multiplexing the first UCI bit and the second UCI bit, the selection of the set of cyclic shift indices indicating the scheduling request bit, and means for selecting a cyclic shift index of the set of cyclic shift indices to indicate the first UCI bit and the second UCI bit; or means for transmitting the UCI message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication of the set of candidate sets of cyclic shift indices from which the set of cyclic shift indices is to be selected to indicate the scheduling request bit.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
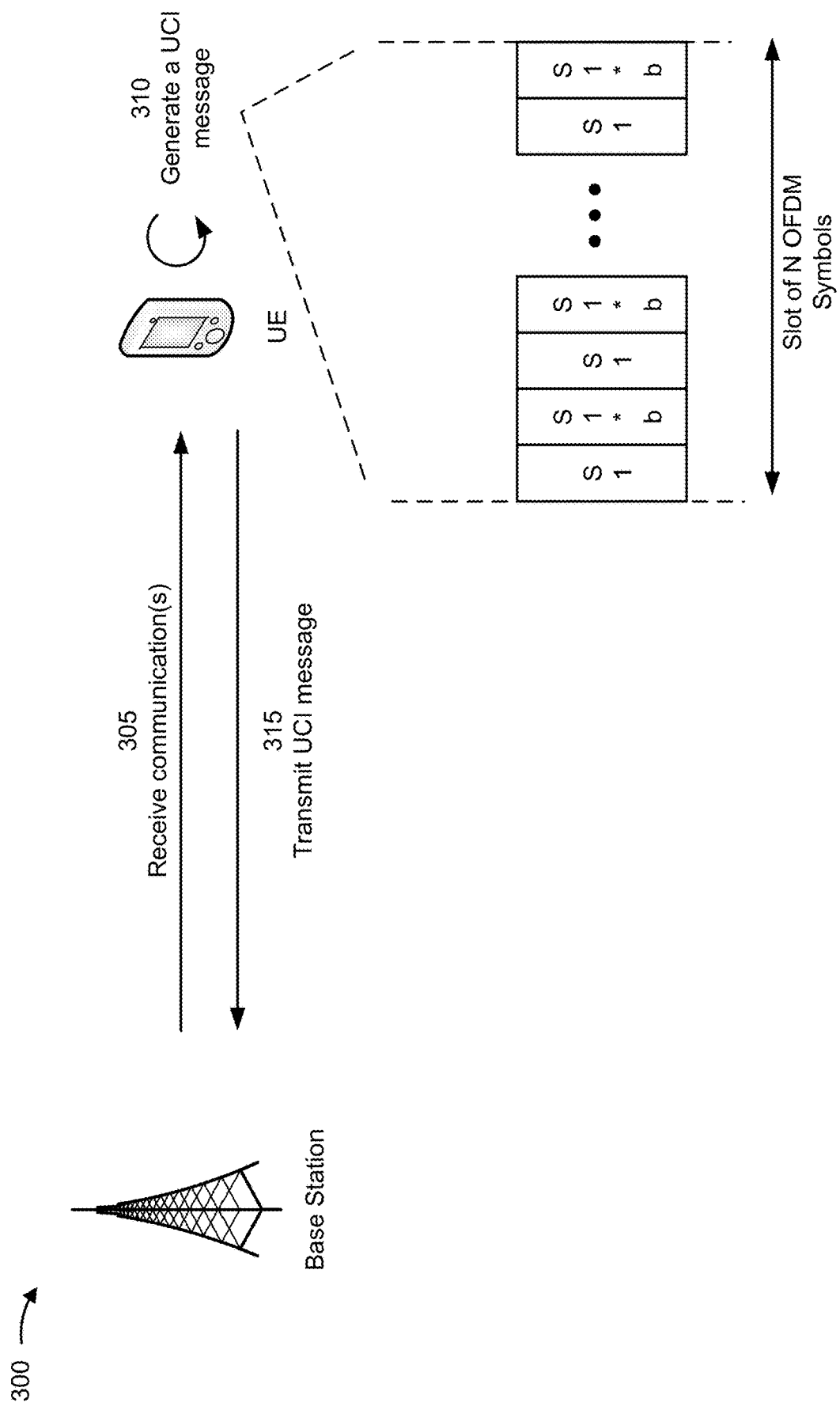
FIG. 3 is a diagram illustrating an example of transmission of an uplink control message, in accordance with the present disclosure.

FIG. 3 is a diagram illustrating an example 300 of transmission of an uplink control message, in accordance with the present disclosure. As shown in FIG. 3, a UE may communicate with a base station. In some aspects, the UE and the base station may be part of a wireless network. The UE may be configured to generate and/or transmit UCI to the base station based at least in part on one or more events, such as receiving a communication and/or determining that the UE has data buffered for transmission, among other examples.

As shown by reference number 305, the UE may receive, and the base station may transmit, one or more communications. For example, the UE may receive a communication associated with a control channel (e.g., a physical downlink control channel (PDCCH)) or a data channel (e.g., a physical downlink shared channel (PD SCH)).

As shown by reference number 310, the UE may generate a UCI message. For example, the UE may generate a UCI message to indicate a hybrid automatic repeat request (HARD) acknowledgment (ACK) or negative ACK (HACK) associated with a received communication. The UE may generate the UCI message based at least in part on a UE-specific sequence, determined by the UE based at least in part on applying a UE-specific cyclic shift to a cell-specific base sequence (e.g., a base sequence). The UE may map the UE-specific sequence to alternating (e.g., even) symbols of the UCI message to be used as DMRSs. The UE may map the UE-specific sequence, modulated by a UCI payload, on remaining (e.g., odd) symbols of the UCI message. The UCI payload may include a 1-bit payload or a 2-bit payload.

The UE may modulate the UE-specific sequence with a 1-bit payload using binary phase shift keying (BPSK) modulation. For a 1-bit payload, the BPSK modulation produces orthogonal UCI messages using noncoherent decoding (e.g., decoding without DMRSs or using DMRSs as part of a codepoint). For example, two codepoints for a UCI message with a 1-bit payload may be the UE-specific sequence multiplied by [1, 1, 1, 1, . . . ] or [1, −1, 1, −1, . . . ].

The UE may modulate the UE-specific sequence with a 2-bit payload using QPSK modulation. For a 2-bit payload, the QPSK modulation produces non-orthogonal UCI messages using noncoherent decoding. For example, four codepoints for a UCI message with a 2-bit payload may be the UE-specific sequence multiplied by:

$[1, (1+j)/\sqrt{2}, 1, (1+j)/\sqrt{2}, ...];$ $[1, (-1+j)/\sqrt{2}, 1, (-1+j)/\sqrt{2}, ...];$ $[1, (-1-j)/\sqrt{2}, 1, (-1-j)/\sqrt{2}, ...];$ or $[1, (1-j)/\sqrt{2}, 1, (1-j)/\sqrt{2}, ...].$ As shown by reference number 315, the UE may transmit, and the base station may receive, the UCI message. Based at least in part on using QPSK modulation of a 2-bit payload, the UCI message codepoints are non-orthogonal and the codepoints are cross-correlated. Based at least in part on the codepoints being non-orthogonal, a base station may fail to receive the UCI message and/or may fail to extract a first UCI bit and a second UCI bit from the UCI message. Based at least in part on the base station failing to extract the first UCI bit and the second UCI bit from the UCI message, the base station may incorrectly determine the first UCI bit or the second UCI bit to be a HARQ-ACK, which may cause the base station to fail to retransmit a communication that was not received by the UE. Additionally, or alternatively, the base station may incorrectly determine the first UCI bit or the second UCI bit to be a HARQ-NACK, which may cause the base station to retransmit a communication that was received by the UE and may consume computing, power, communication, and/or network resources to schedule the communication and to retransmit the communication.

As indicated above, FIG. 3 is provided as an example. Other examples may differ from what is described with regard to FIG. 3.

In some wireless networks, a UE may be configured to transmit a scheduling request to a base station. The scheduling request may indicate that the UE has data buffered for transmission to the base station. To transmit the scheduling request, the UE may use one or more resources configured for scheduling requests and/or may piggyback the scheduling request within a physical uplink control channel (PUCCH) communication, such as a UCI message carrying HARQ feedback. However, to indicate the scheduling request, the UE may increase overhead to indicate the scheduling request via a field (e.g., a 1-bit field) of the UCI message and/or the one or more resources configured for scheduling requests. The increased overhead may consume computing, communication, network, and/or power resources to schedule and/or to communicate the scheduling request. Additionally, or alternatively, the UE may transmit the scheduling request with increased latency based at least in part on waiting until a scheduling request occasion is available. This may increase a latency of transmission of the data buffered for transmission, which may cause communication errors based at least in part on the data being transmitted late.

In some aspects described herein, a UE may generate a UCI message including a scheduling request bit multiplexed with a first UCI bit (e.g., a first HARQ-ACK bit) and a second UCI bit (e.g., a second HARQ-ACK bit). The UE may generate the UCI message based at least in part on selecting a set of sequences, of a set of candidate sets of sequences, to use for multiplexing the first UCI bit and the second UCI bit. The selection of the set of sequences may indicate the scheduling request bit. For example, selection of a first set of sequences may indicate a first value of the scheduling request bit (e.g., no request for resources) and selection of a second set of sequences may indicate a second value of the scheduling request bit (e.g., a request for resources).

The UE may multiplex the first UCI bit and the second UCI bit based at least in part on the set of sequences selected to indicate the scheduling request bit. In some aspects, the UE may apply a single sequence (e.g., the set of sequences comprises a single sequence) to both of the first UCI bit and the second UCI bit using QPSK modulation of the 2-bit UCI payload. In some implementations, the UE may apply a first sequence, of the set of sequences, to the first UCI bit and may apply a second sequence, of the set of sequences, to the second UCI bit. The UE may superimpose the first UCI bit having the first sequence applied with the second UCI bit having the second sequence applied. In some aspects, the UE may select a sequence, of the set of sequences, to indicate the first UCI bit and may apply the sequence to the second UCI bit to indicate the second UCI bit via a payload of the UCI message.

In some aspects, the UE may select a set of cyclic shift indices, of a set of candidate sets of cyclic shift indices, to use for multiplexing the first UCI bit and the second UCI bit, with the selection of the set of cyclic shift indices indicating the scheduling request bit. The UE may select a cyclic shift index of the set of cyclic shift indices to indicate the first UCI bit and the second UCI bit.

Based at least in part on the UE selecting a set of sequences, or a set of cyclic shift indices, of a set of candidate sets of sequences or cyclic shift indices to indicate an scheduling request bit, and multiplexing the first UCI bit and the second UCI bit based at least in part on the set of sequences selected, the UE may indicate the scheduling request bit, the first UCI bit, and the second UCI bit with mutually orthogonal signaling. Based at least in part on the UE using mutually orthogonal signaling, the base station has an increased likelihood of receiving the scheduling request and the UCI messages and extracting the first UCI bit and the second UCI bit. In this way, the base station and/or the UE may conserve computing, power, communication, and/or network resources that may have otherwise been used to detect and/or correct a failure to receive a downlink communication and/or to schedule and/or retransmit a communication received by the UE. Additionally, or alternatively, the UE may conserve computing, power, communication, and/or network resources that may have otherwise been used to transmit the scheduling request using additional overhead or delay transmission of the scheduling request until a scheduling request occasion.

Figure 4:
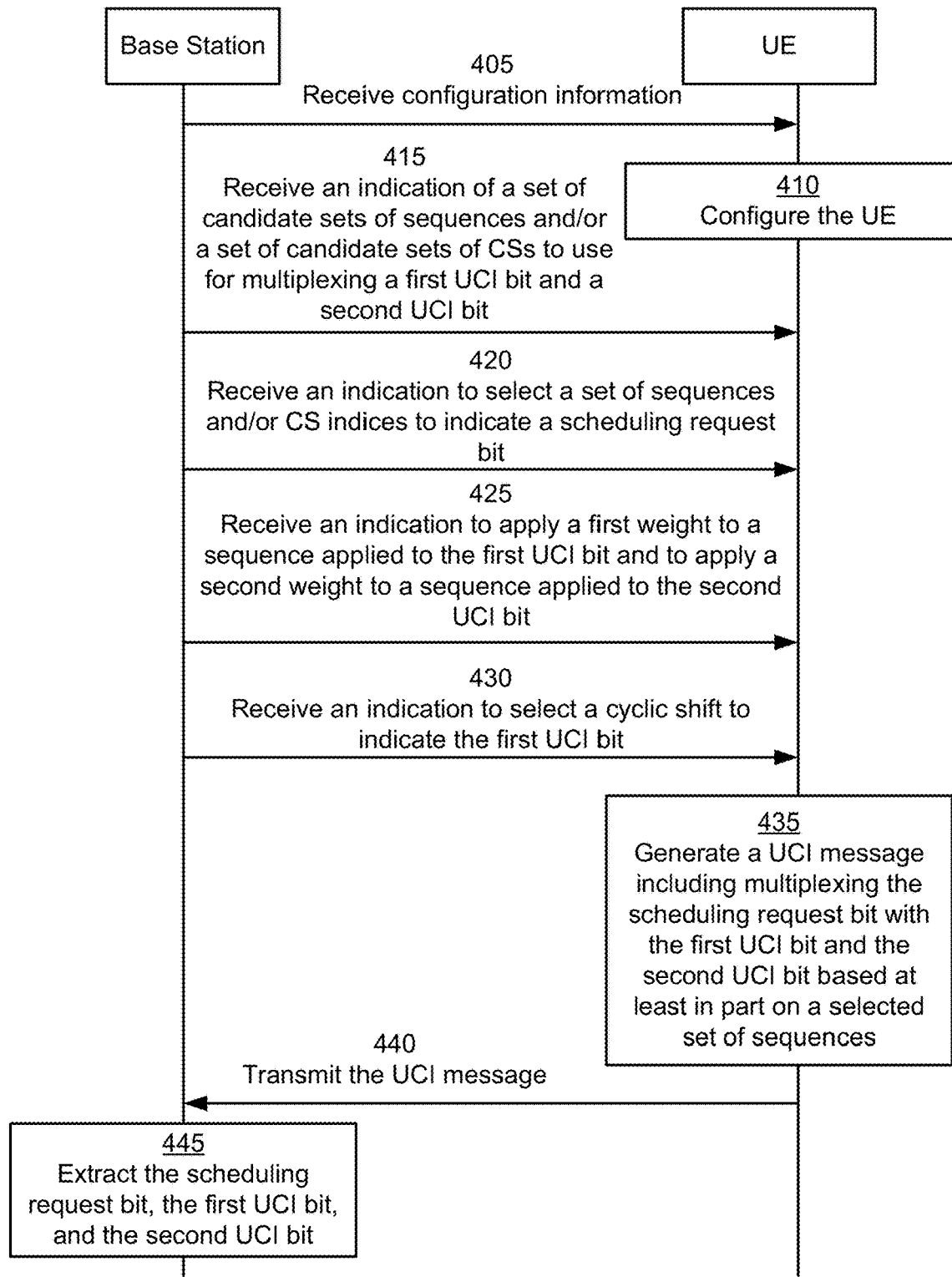
FIG. 4 is a diagram illustrating an example associated with uplink control information multiplexing, in accordance with the present disclosure.

FIG. 4 is a diagram illustrating an example 400 associated with uplink control information multiplexing, in accordance with the present disclosure. As shown in FIG. 4, a UE (e.g., UE 120) may communicate with a base station (e.g., base station 110). In some aspects, the UE and the base station may be part of a wireless network (e.g., wireless network 100).

As shown by reference number 405, the UE may receive configuration information (e.g., from the base station, another base station, and/or the like) and/or may determine the configuration information based at least in part on a communication protocol. In some aspects, the UE may receive the configuration information via one or more of radio resource control (RRC) signaling, medium access control elements (MAC CEs), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate how the UE is to generate a UCI message having a scheduling request multiplexed with a first UCI bit and a second UCI bit. In some aspects, the configuration information may indicate that the UE is to select a set of sequences and/or cyclic shifts, of a set of candidate sets of sequences and/or cyclic shifts, to indicate the scheduling request bit. In some aspects, the configuration information may indicate that the UE is to apply a single sequence (e.g., for a set of sequences having a single sequence) to a 2-bit payload that includes the first UCI bit and the second UCI bit (e.g., using QPSK modulation). In some aspects, the configuration information may indicate that the UE is to apply a first sequence, of the set of sequences or determined based at least in part on a first cyclic shift of the set of cyclic shifts, to a first UCI bit and a second sequence, of the set of sequences or determined based at least in part on a second cyclic shift of the set of cyclic shifts, to a second UCI bit. In some aspects, the configuration information may indicate that the UE is to superimpose the first UCI bit having the first sequence applied with the second UCI bit having the second sequence applied. In some aspects, the configuration information may indicate that the UE is to select a sequence, of the set of sequences, to apply to the second UCI bit, with the selection of the sequence indicating the first UCI bit. In some aspects, the configuration information may indicate the first sequence and the second sequence to use for generating the UCI message.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may receive, and the base station may transmit, an indication of a set of candidate sets of sequences and/or a set of candidate sets of cyclic shifts (CSs) to use for multiplexing a first UCI bit and a second UCI bit. In some aspects, the UE may receive the indication of the set of candidate sets of cyclic shifts and may determine the set of candidate sets of sequences based at least in part on applying the set of candidate cyclic shifts to a cell-specific base sequence. The set of candidate sets of sequences may include UE-specific sequences. In some aspects, the indication of the set of candidate sets of sequences may include an indication of a set of cyclic shifts to apply to a cell-specific base sequence to generate sequences of the set of candidate sets of sequences.

In some aspects, the indication of the set of candidate sets of sequences and/or the set of candidate sets of cyclic shifts may include an indication that the UE is to select a candidate set of sequences and/or a candidate set of cyclic shifts from the set of candidate sets of sequences and/or cyclic shifts to indicate the scheduling request bit. In some aspects, the set of candidate sets of sequences includes the set of sequences and an additional set of sequences, with the set of sequences being associated with a first candidate value of the scheduling request bit, and with the additional set of sequences associated with a second candidate value of the scheduling request bit.

In some aspects, a candidate set of sequences may include a first sequence (e.g., including a cell-specific base sequence having a first cyclic shift applied) and a second sequence (e.g., including the cell-specific base sequence having a second cyclic shift applied).

In some aspects, the indication of the set of candidate sets of cyclic shifts to use for multiplexing the first UCI bit and the second UCI bit includes an indication of the set of candidate sets of cyclic shift indices from which the set of cyclic shift indices is to be selected to indicate the scheduling request bit.

In some aspects, the indication of the set of candidate sets of sequences and/or the set of candidate sets of cyclic shifts may indicate that the UE is to select a sequence and/or a cyclic shift within a candidate set of sequences and/or within a candidate set of cyclic shifts to indicate the first UCI bit. The indication of the set of candidate sets of sequences and/or the set of candidate sets of cyclic shifts may include, or may be associated with, an indication that selection of the sequence from the candidate set of sequences and/or candidate set of cyclic shifts indicates the first UCI bit. In some aspects, the indication of the set of candidate sets of sequences and/or the set of candidate sets of cyclic shifts may include, or may be associated with, an indication that selection of a first sequence is associated with a first candidate value of the first UCI bit and selection of a second sequence is associated with a second candidate value of the first UCI bit.

As shown by reference number 420, the UE may receive, and the base station may transmit, an indication to select a set of sequences from the set of candidate sets of sequences to indicate the scheduling request bit. Similarly, the UE may receive, and the base station may transmit, an indication to select a set of cyclic shifts from the set of candidate sets of cyclic shifts to indicate the scheduling request bit.

As shown by reference number 425, the UE may receive, and the base station may transmit, an indication to apply a first weight to a first sequence to be applied to the first UCI bit and a second weight to a second sequence to be applied to the second UCI bit for superimposing the first UCI bit and the second UCI bit. In some aspects, the indication may indicate that the first weight is to be applied to the first UCI bit based at least in part on the first weight being greater than the second weight and based at least in part on the first UCI bit having a priority that is greater than a priority of the second UCI bit.

In some aspects, the UE may fail to receive, and/or the base station may fail to transmit, an indication to apply a first weight to the first sequence and a second weight to the second sequence for superimposing the first UCI bit and the second UCI bit. In other words, application of the first weight and the second weight may be optional. In these scenarios, the UE may apply equal weights (e.g., 1) to the first sequence and the second sequence.

As shown by reference number 430, the UE may receive, and the base station may transmit, an indication to select a cyclic shift to indicate the first UCI bit. Similarly, the UE may receive, and the base station may transmit, an indication to select a sequence to indicate the first UCI bit. For example, the UE my receive a mapping of a sequence of each candidate set of cyclic shifts and/or each candidate set of sequences to a first value of the first UCI bit and to a second value of the first UCI bit. The indication may further indicate that the UE is to transmit the UCI message having a selected sequence applied to the second UCI bit (e.g., using BPSK), with the selected sequence indicating the scheduling request bit and the first UCI bit.

In some aspects, the indication of the set of candidate sets of sequences and/or the set of candidate sets of CSs to use for multiplexing a first UCI bit and a second UCI bit, the indication to select the set of sequences and/or CS indices to indicate the scheduling request bit, the indication to apply the first weight to the sequence applied to the first bit and to apply the second weight to the sequence applied to the second UCI bit, and/or the indication to select a cyclic shift to indicate the first UCI bit may be combined (e.g., transmitted and/or received in a single communication). In some aspects, the indication of the set of candidate sets of sequences and/or the set of candidate sets of CSs to use for multiplexing a first UCI bit and a second UCI bit, the indication to select the set of sequences and/or CS indices to indicate the scheduling request bit, the indication to apply the first weight to the sequence applied to the first bit and to apply the second weight to the sequence applied to the second UCI bit, and/or the indication to select a cyclic shift to indicate the first UCI bit may be omitted.

As shown by reference number 435, the UE may generate a UCI message including multiplexing the scheduling request bit with the first UCI bit and the second UCI bit based at least in part on a selected set of sequences. For example, the UE may generate the UCI message based at least in part on selecting a set of sequences and/or a set of cyclic shifts to indicate the scheduling request bit. The UE may multiplex the first UCI bit and the second UCI bit based at least in part on one or more sequences and/or cyclic shifts within the set of sequences and/or the set of cyclic shifts.

In some aspects, the UE may generate a UCI message using a single sequence, of the set of sequences and/or determined from the set of cyclic shifts, with the set of sequences and/or set of cyclic shifts including only the single sequence. The UE may apply the single sequence to the first UCI bit and the second UCI bit. In some aspects, the UE may modulate (e.g., based at least in part on QPSK) a symbol of two bits including the first UCI bit and the second UCI bit. For example, the UE may combine the second UCI bit, modulated based at least in part QPSK, with the single sequence on even OFDM symbols.

In some aspects, the UE may generate a UCI message based at least in part on applying a first sequence, of the set of sequences and/or determined from the set of cyclic shifts, to the first UCI bit and applying a second sequence, of the set of sequences and/or determined from the set of cyclic shifts, to the second UCI bit. The first sequence may be orthogonal to the first sequence. In some aspects, the UE may superimpose the first UCI bit having the first sequence applied with the second UCI bit having the second sequence applied. In some aspects, the UE may apply different weights (e.g., associated with priorities of the UCI bits) to the UCI bits having the orthogonal sequences applied. In some aspects, the UE may apply the first weight to the first UCI bit having the first sequence applied based at least in part on the first weight being greater than the second weight and based at least in part on the first UCI bit having a higher priority than a priority of the second UCI bit.

A base station may receive the UCI message based at least in part on correlating the first sequence with the UCI message to extract the first UCI bit and correlating the second sequence with the UCI message to extract the second UCI bit. In some aspects, the different weights may improve a likelihood of a base station extracting the first UCI bit and the second UCI bit from the UCI message.

In some aspects, the UE may generate a UCI message based at least in part on selecting a first sequence, of the set of sequences and/or determined from the set of cyclic shifts, to apply to the second UCI bit, with the selection of the first sequence indicating the first UCI bit and a payload of the UCI message indicating the second UCI bit. In some aspects, the UE may select the first sequence to apply to the second UCI bit to indicate a first candidate value of the first UCI bit, or may select the second sequence to apply to the second UCI bit to indicate a second candidate value of the first UCI bit. In some aspects, the UE may apply the first sequence or the second sequence to the second UCI bit using BPSK modulation (e.g., combining and/or multiplying the second UCI bit with the sequence on even OFDM symbols) of a 1-bit payload to indicate a first value of the second UCI bit or a second value of the second UCI bit. In some aspects, the UE may select the sequence to indicate the first UCI bit based at least in part on the first UCI bit having a higher priority than a priority of the second UCI bit.

For example, a set of candidate sets of sequences may include a first candidate set of sequences including a first candidate set of sequences {Sequence A; Sequence B} and a second candidate set of sequences {Sequence C; Sequence D}. The UE may be configured (e.g., based at least in part on the indication) to select the first candidate set of sequences to indicate a first value of the scheduling request bit. The UE may select sequence B of the first candidate set of sequences to indicate a second value of the first UCI bit. In this way, selection of Sequence B indicates the first value of the scheduling request bit and the second value of the first UCI bit. The UE may apply Sequence B to the second UCI bit (e.g., using BPSK modulation) to indicate the second UCI bit via a 1-bit payload of the UCI message.

In some aspects, the UE may generate the UCI message based at least in part on selecting a set of cyclic shift indices, of the set of candidate sets of cyclic shifts (e.g., cyclic shift indices), to use for multiplexing the first UCI bit and the second UCI bit. The UE may indicate the scheduling request bit based at least in part on the selection of the set of cyclic shift indices. The UE may indicate a value of the first UCI bit based at least in part on a selected cyclic shift within the set of cyclic shifts. In some aspects, the UCI message may include PUCCH format 0 message.

For example, the set of cyclic shift indices may include a first cyclic shift index, a second cyclic shift index, a third cyclic shift index, and a fourth cyclic shift index. The first cyclic shift index may be at a first location and may indicate a first value of the first UCI bit and a first value of the second UCI bit. The second cyclic shift index may be at a second location and may indicate the first value of the first UCI bit and a second value of the second UCI bit. The third cyclic shift index may be at a third location and may indicate a second value of the first UCI bit and the first value of the second UCI bit. The fourth cyclic shift index may be at a fourth location and may indicate the second value of the first UCI bit and the second value of the second UCI bit. In some aspects, the first cyclic shift index may be grouped with the second cyclic shift index and the third cyclic shift index may be grouped with the fourth cyclic shift index based at least in part on the first UCI bit having a priority that is higher than a priority of the second UCI bit. For example, a first distance from the first location to the second location may be less than a second distance from the first location to the third location and/or a third distance from the first location to the fourth location. In this way, a base station that receives the UCI message may determine a value of the first UCI bit with higher reliability based at least in part on determining that that cyclic shift is within a set of grouped cyclic shift indices.

As shown by reference number 440, the UE may transmit, and the base station may receive, the UCI message. In some aspects, the UCI message may be a PUCCH format 1 message or a PUCCH format 2 message. In some aspects, the UCI message may either include the first sequence applied to the first UCI bit and the second sequence applied to the second UCI bit (e.g., using superposition), or include a selected sequence applied to the second UCI bit with the selected sequence indicating the first UCI bit.

As shown by reference number 445, the base station may extract the scheduling request bit, the first UCI bit, and the second UCI bit from the UCI message. In some aspects, the base station may attempt to correlate the UCI message with the sequences of the set of candidate sets of sequences, and/or associated with the set of candidate sets of cyclic shifts, to determine one or more sequences applied to the UCI message. Based at least in part on the one or more sequences applied to the UCI, the base station may determine the scheduling request bit.

Additionally, the base station may determine the first UCI bit and/or the second UCI bit based at least in part on determining one or more sequences applied to the UCI. In some aspects, the base station may demodulate, using QPSK, the UCI message to determine a 2-bit payload of the UCI message. In some aspects, the base station in which two signals are superimposed, the base station may correlate the first sequence with the UCI message to extract the first UCI bit and correlate the second sequence with the UCI message to extract the second UCI bit. In some aspects, the base station may correlate the first sequence with the UCI message and correlate the second sequence with the UCI message to determine whether the UCI message has the first sequence applied or the second sequence applied. The base station may extract the first UCI bit based at least in part on an applied sequence and may extract the second UCI bit based at least in part on a payload (e.g., a BPSK modulated payload) extracted from the UCI message.

Based at least in part on the UE selecting a set of sequences, or a set of cyclic shift indices, of a set of candidate sets of sequences or cyclic shift indices to indicate an scheduling request bit, and multiplexing the first UCI bit and the second UCI bit based at least in part on the set of sequences selected, the UE may indicate the scheduling request bit, the first UCI bit, and the second UCI bit with mutually orthogonal signaling. Based at least in part on the UE using mutually orthogonal signaling, the base station has an increased likelihood of receiving the scheduling request and the UCI messages and extracting the first UCI bit and the second UCI bit. In this way, the base station and/or the UE may conserve computing, power, communication, and/or network resources that may have otherwise been used to detect and/or correct a failure to receive a downlink communication and/or to schedule and/or retransmit a communication received by the UE. Additionally, or alternatively, the UE may conserve computing, power, communication, and/or network resources that may have otherwise been used to transmit the scheduling request using additional overhead or delay transmission of the scheduling request until a scheduling request occasion.

As indicated above, FIG. 4 is provided as an example. Other examples may differ from what is described with regard to FIG. 4.

Figure 5:
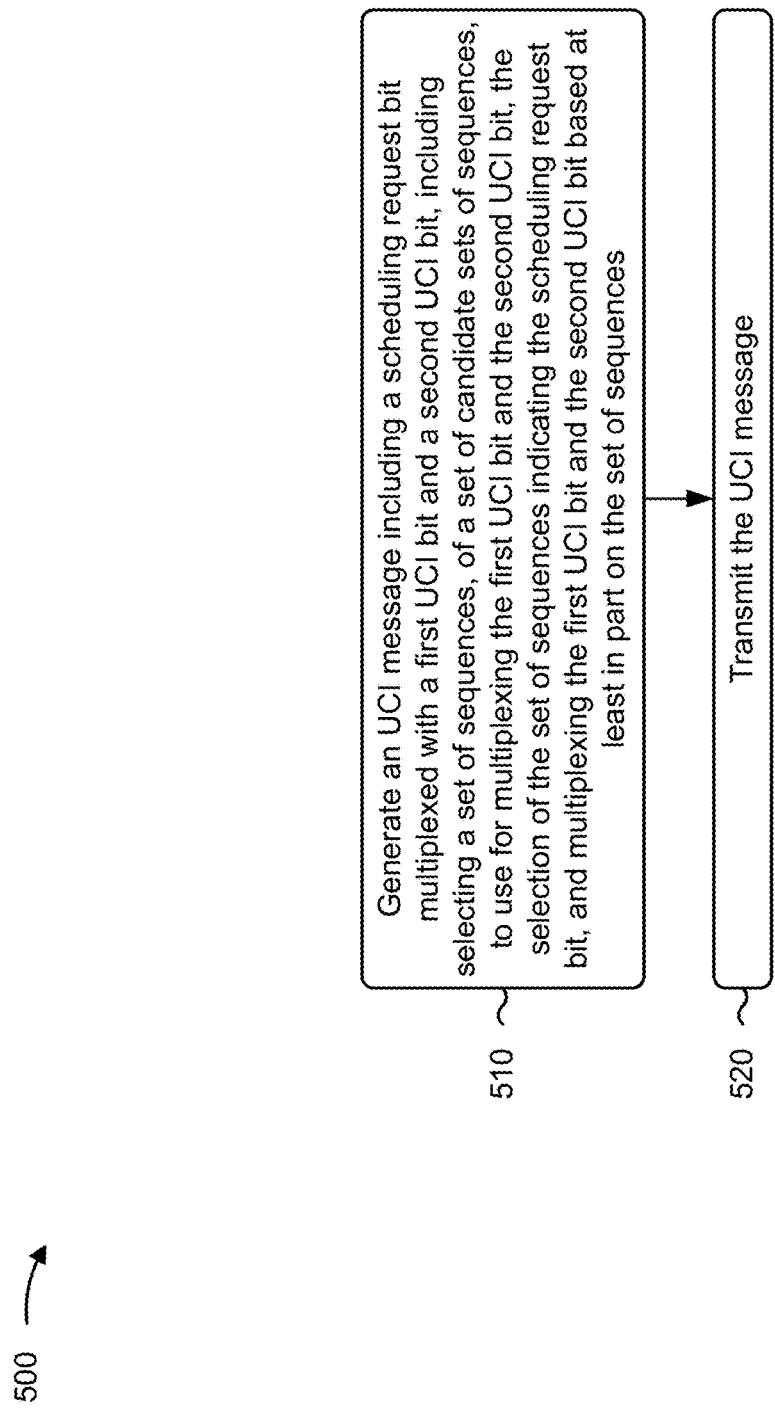
FIGS. 5 and 6 are diagrams illustrating example processes associated with uplink control information multiplexing, in accordance with the present disclosure.

FIG. 5 is a diagram illustrating an example process 500 performed, for example, by a UE, in accordance with the present disclosure. Example process 500 is an example where the UE (e.g., UE 120) performs operations associated with uplink control information multiplexing.

As shown in FIG. 5, in some aspects, process 500 may include generating an UCI message including a scheduling request bit multiplexed with a first UCI bit and a second UCI bit, including: selecting a set of sequences, of a set of candidate sets of sequences, to use for multiplexing the first UCI bit and the second UCI bit, the selection of the set of sequences indicating the scheduling request bit, and multiplexing the first UCI bit and the second UCI bit based at least in part on the set of sequences (block 510). For example, the UE (e.g., using communication manager 708, depicted in FIG. 7) may generate an uplink control information (UCI) message including a scheduling request bit multiplexed with a first UCI bit and a second UCI bit, including: selecting a set of sequences, of a set of candidate sets of sequences, to use for multiplexing the first UCI bit and the second UCI bit, the selection of the set of sequences indicating the scheduling request bit, and multiplexing the first UCI bit and the second UCI bit based at least in part on the set of sequences, as described above.

As further shown in FIG. 5, in some aspects, process 500 may include transmitting the UCI message (block 520). For example, the UE (e.g., using transmission component 704, depicted in FIG. 7) may transmit the UCI message, as described above.

Process 500 may include additional aspects, such as any single aspect or any combination of aspects described below and/or in connection with one or more other processes described elsewhere herein.

In a first aspect, process 500 includes receiving an indication of the set of candidate sets of sequences from which the set of sequences is to be selected to indicate the scheduling request bit.

In a second aspect, alone or in combination with the first aspect, the indication of the set of candidate sets of sequences includes an indication that selection of the set of sequences from the set of candidate sets of sequences indicates the scheduling request bit.

In a third aspect, alone or in combination with one or more of the first and second aspects, the indication of the set of candidate sets of sequences includes an indication of a set of cyclic shifts to apply to a cell-specific base sequence to generate sequences of the set of candidate sets of sequences.

In a fourth aspect, alone or in combination with one or more of the first through third aspects, the set of candidate sets of sequences includes the set of sequences and an additional set of sequences, wherein the set of sequences is associated with a first candidate value of the scheduling request bit, and wherein the additional set of sequences is associated with a second candidate value of the scheduling request bit.

In a fifth aspect, alone or in combination with one or more of the first through fourth aspects, the UCI message is a physical uplink control channel format 1 message.

In a sixth aspect, alone or in combination with one or more of the first through fifth aspects, the set of sequences includes a single sequence, and multiplexing the scheduling request bit with the first UCI bit and the second UCI bit includes applying the single sequence to the first UCI bit and the second UCI bit.

In a seventh aspect, alone or in combination with one or more of the first through sixth aspects, multiplexing the first UCI bit and the second UCI bit including applying the single sequence to the first UCI bit and the second UCI bit comprises modulating, based at least in part on QPSK, a symbol of two bits including the first UCI bit and the second UCI bit.

In an eighth aspect, alone or in combination with one or more of the first through seventh aspects, modulating, based at least in part on QPSK, the symbol of two bits including the first UCI bit and the second UCI bit comprises combining the second UCI bit, modulated based at least in part QPSK, with the single sequence on even OFDM symbols.

In a ninth aspect, alone or in combination with one or more of the first through eighth aspects, the set of sequences includes a first sequence and a second sequence that is orthogonal to the first sequence, and multiplexing the scheduling request bit with the first UCI bit and the second UCI bit includes applying the first sequence to the first UCI bit and applying the second sequence to the second UCI bit.

In a tenth aspect, alone or in combination with one or more of the first through ninth aspects, the first sequence comprises a cell-specific base sequence having a first cyclic shift applied, and the second sequence comprises the cell-specific base sequence having a second cyclic shift applied.

In an eleventh aspect, alone or in combination with one or more of the first through tenth aspects, process 500 includes receiving, from a base station, an indication of the first cyclic shift and the second cyclic shift.

In a twelfth aspect, alone or in combination with one or more of the first through eleventh aspects, generating the UCI message including a scheduling request bit multiplexed with the first UCI bit and the second UCI bit comprises superimposing the first UCI bit having the first sequence applied with the second UCI bit having the second sequence applied.

In a thirteenth aspect, alone or in combination with one or more of the first through twelfth aspects, the UCI message is configured to be received based at least in part on correlating the first sequence with the UCI message to extract the first UCI bit and correlating the second sequence with the UCI message to extract the second UCI bit.

In a fourteenth aspect, alone or in combination with one or more of the first through thirteenth aspects, generating the UCI message including a scheduling request bit multiplexed with the first UCI bit and the second UCI bit comprises applying a first weight to the first UCI bit having the first sequence applied and applying a second weight to the second UCI bit having the second sequence applied, and superimposing the first UCI bit having the first sequence applied, and with the first weight applied, with the second UCI bit having the second sequence applied, and with the second weight applied.

In a fifteenth aspect, alone or in combination with one or more of the first through fourteenth aspects, the first weight is applied to the first UCI bit having the first sequence applied based at least in part on the first weight being greater than the second weight and based at least in part on the first UCI bit having a higher priority than a priority of the second UCI bit.

In a sixteenth aspect, alone or in combination with one or more of the first through fifteenth aspects, process 500 includes receiving, from a base station, an indication to apply the first weight to the first UCI bit and to apply the second weight to the second UCI bit.

In a seventeenth aspect, alone or in combination with one or more of the first through sixteenth aspects, multiplexing the scheduling request bit with the first UCI bit and the second UCI bit comprises selecting a sequence, of the set of sequences, to apply to the second UCI bit, the selection of the sequence indicating the first UCI bit, and applying the sequence to the second UCI bit.

In an eighteenth aspect, alone or in combination with one or more of the first through seventeenth aspects, process 500 includes receiving an indication that selection of the sequence from the set of sequences indicates the first UCI bit.

In a nineteenth aspect, alone or in combination with one or more of the first through eighteenth aspects, the set of sequences includes the sequence and an additional sequence, wherein the sequence is associated with a first candidate value of the first UCI bit, and wherein the additional sequence is associated with a second candidate value of the first UCI bit.

In a twentieth aspect, alone or in combination with one or more of the first through nineteenth aspects, applying the sequence to the second UCI bit comprises modulating, based at least in part on binary phase shift keying (BPSK), a symbol of one bit including the second UCI bit.

In a twenty-first aspect, alone or in combination with one or more of the first through twentieth aspects, modulating, based at least in part on BPSK, the symbol of one bit including the second UCI bit comprises combining the second UCI bit, modulated based at least in part BPSK, with the sequence on even OFDM symbols.

In a twenty-second aspect, alone or in combination with one or more of the first through twenty-first aspects, the first UCI bit has a priority that is higher than a priority of the second UCI bit.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
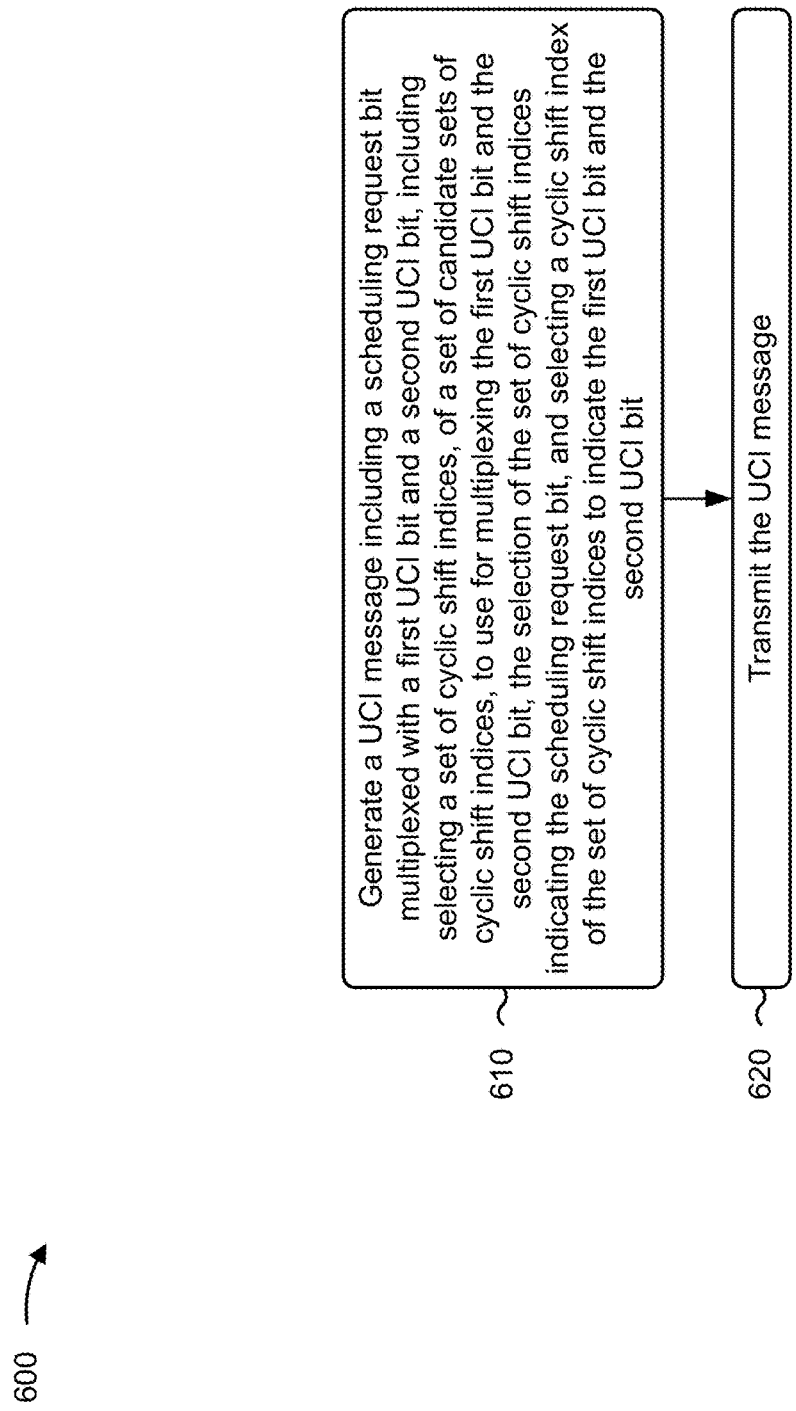

FIG. 6 is a diagram illustrating an example process 600 performed, for example, by a UE, in accordance with the present disclosure. Example process 600 is an example where the UE (e.g., UE 120) performs operations associated with uplink control information multiplexing.

As shown in FIG. 6, in some aspects, process 600 may include generating an UCI message including a scheduling request bit multiplexed with a first UCI bit and a second UCI bit, including: selecting a set of cyclic shift indices, of a set of candidate sets of cyclic shift indices, to use for multiplexing the first UCI bit and the second UCI bit, the selection of the set of cyclic shift indices indicating the scheduling request bit, and selecting a cyclic shift index of the set of cyclic shift indices to indicate the first UCI bit and the second UCI bit (block 610). For example, the UE (e.g., using communication manager 708, depicted in FIG. 7) may generate an UCI message including a scheduling request bit multiplexed with a first UCI bit and a second UCI bit, including: selecting a set of cyclic shift indices, of a set of candidate sets of cyclic shift indices, to use for multiplexing the first UCI bit and the second UCI bit, the selection of the set of cyclic shift indices indicating the scheduling request bit, and selecting a cyclic shift index of the set of cyclic shift indices to indicate the first UCI bit and the second UCI bit, as described above.

As further shown in FIG. 6, in some aspects, process 600 may include transmitting the UCI message (block 620). For example, the UE (e.g., using transmission component 704, depicted in FIG. 7) may transmit the UCI message, as described above.

Process 600 may include additional aspects, such as any single aspect or any combination of aspects described below and/or in connection with one or more other processes described elsewhere herein.

In a first aspect, process 600 includes receiving an indication of the set of candidate sets of cyclic shift indices from which the set of cyclic shift indices is to be selected to indicate the scheduling request bit.

In a second aspect, alone or in combination with the first aspect, the indication of the set of candidate sets of cyclic shift indices includes an indication that selection of the set of cyclic shift indices from the set of candidate sets of cyclic shift indices indicates the scheduling request bit.

In a third aspect, alone or in combination with one or more of the first and second aspects, the set of cyclic shift indices includes a first cyclic shift index, a second cyclic shift index, a third cyclic shift index, and a fourth cyclic shift index, wherein the first cyclic shift index is at a first location and indicates a first value of the first UCI bit and a first value of the second UCI bit, wherein the second cyclic shift index is at a second location and indicates the first value of the first UCI bit and a second value of the second UCI bit, wherein the third cyclic shift index is at a third location and indicates a second value of the first UCI bit and the first value of the second UCI bit, and wherein the fourth cyclic shift index is at a fourth location and indicates the second value of the first UCI bit and the second value of the second UCI bit.

In a fourth aspect, alone or in combination with one or more of the first through third aspects, a first distance from the first location to the second location is less than a second distance from the first location to the third location, and the first distance is less than a third distance from the first location to the fourth location.

In a fifth aspect, alone or in combination with one or more of the first through fourth aspects, the UCI message is a physical uplink control channel format 0 message.

In a sixth aspect, alone or in combination with one or more of the first through fifth aspects, the first UCI bit has a priority that is higher than a priority of the second UCI bit.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
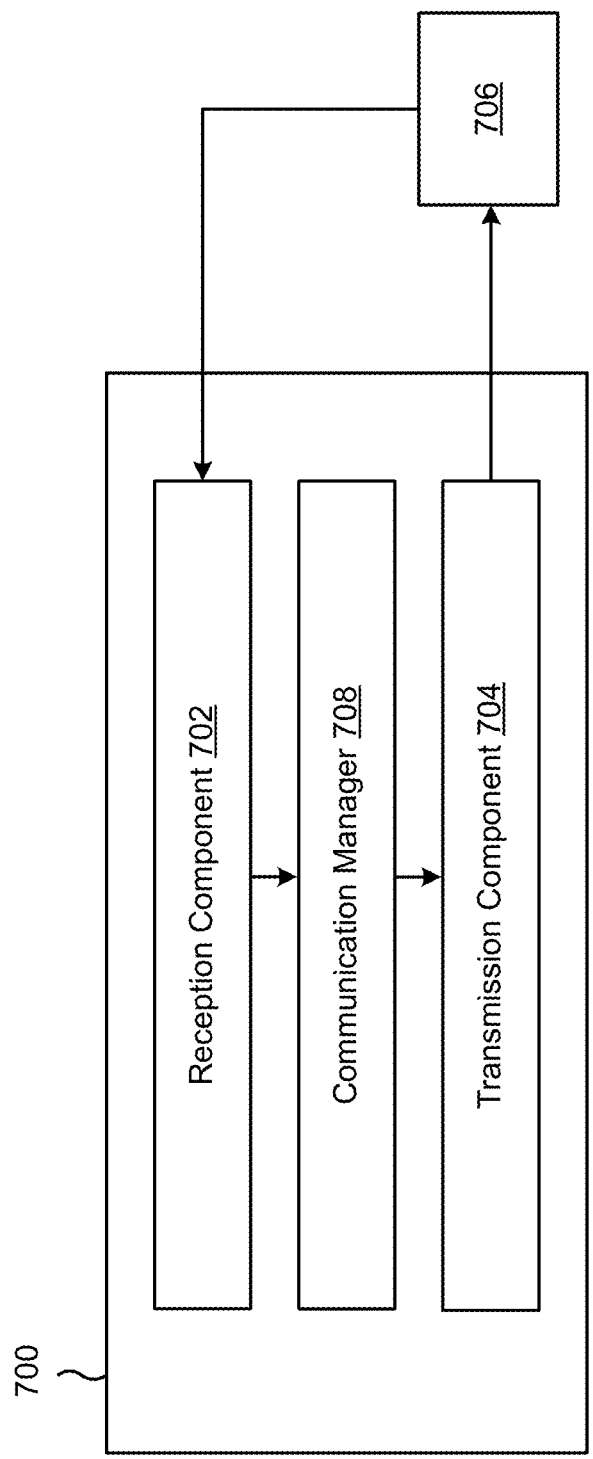
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708.

In some aspects, the apparatus 700 may be configured to perform one or more operations described herein in connection with FIGS. 4 and/or 9. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 708 may generate an uplink control information (UCI) message including a scheduling request bit multiplexed with a first UCI bit and a second UCI bit, including selecting a set of sequences, of a set of candidate sets of sequences, to use for multiplexing the first UCI bit and the second UCI bit, the selection of the set of sequences indicating the scheduling request bit, and multiplexing the first UCI bit and the second UCI bit based at least in part on the set of sequences. The transmission component 704 may transmit the UCI message.

The reception component 702 may receive an indication of the set of candidate sets of sequences from which the set of sequences is to be selected to indicate the scheduling request bit.

The reception component 702 may receive, from a base station, an indication of the first cyclic shift and the second cyclic shift.

The reception component 702 may receive, from a base station, an indication to apply the first weight to the first UCI bit and to apply the second weight to the second UCI bit.

The reception component 702 may receive an indication that selection of the sequence from the set of sequences indicates the first UCI bit.

The communication manager 708 may generate an uplink control information (UCI) message including a scheduling request bit multiplexed with a first UCI bit and a second UCI bit, including selecting a set of cyclic shift indices, of a set of candidate sets of cyclic shift indices, to use for multiplexing the first UCI bit and the second UCI bit, the selection of the set of cyclic shift indices indicating the scheduling request bit, and selecting a cyclic shift index of the set of cyclic shift indices to indicate the first UCI bit and the second UCI bit. The transmission component 704 may transmit the UCI message.

The reception component 702 may receive an indication of the set of candidate sets of cyclic shift indices from which the set of cyclic shift indices is to be selected to indicate the scheduling request bit.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
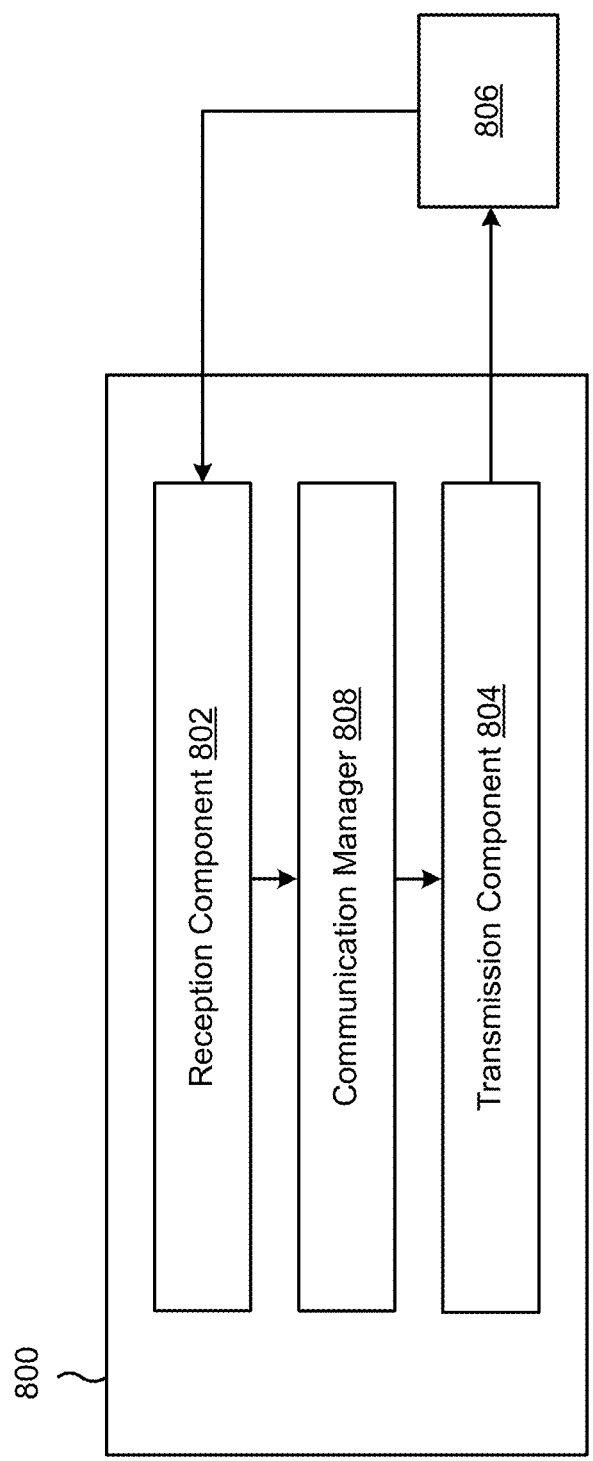

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 4 and/or 9. Additionally, or alternatively, the apparatus 800 may be configured to perform one or more processes described herein. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit configuration information to the UE. The transmission component 804 may transmit an indication of a set of candidate sets of sequences and/or a set of candidate cyclic shifts to use for multiplexing a first UCI bit and a second UCI bit. The transmission component 804 may transmit an indication to select a set of sequences and/or cyclic shift indices to indicate a scheduling request bit. The transmission component 804 may transmit an indication to apply a first weight to a sequence applied to a first UCI bit and to apply a second weight to a second UCI bit. The transmission component 804 may transmit an indication to select a set of cyclic shifts to indicate the first UCI bit. The reception component 802 may receive the UCI message. The communication manager 808 may extract the scheduling request bit, the first UCI bit, and the second UCI bit from the UCI message.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
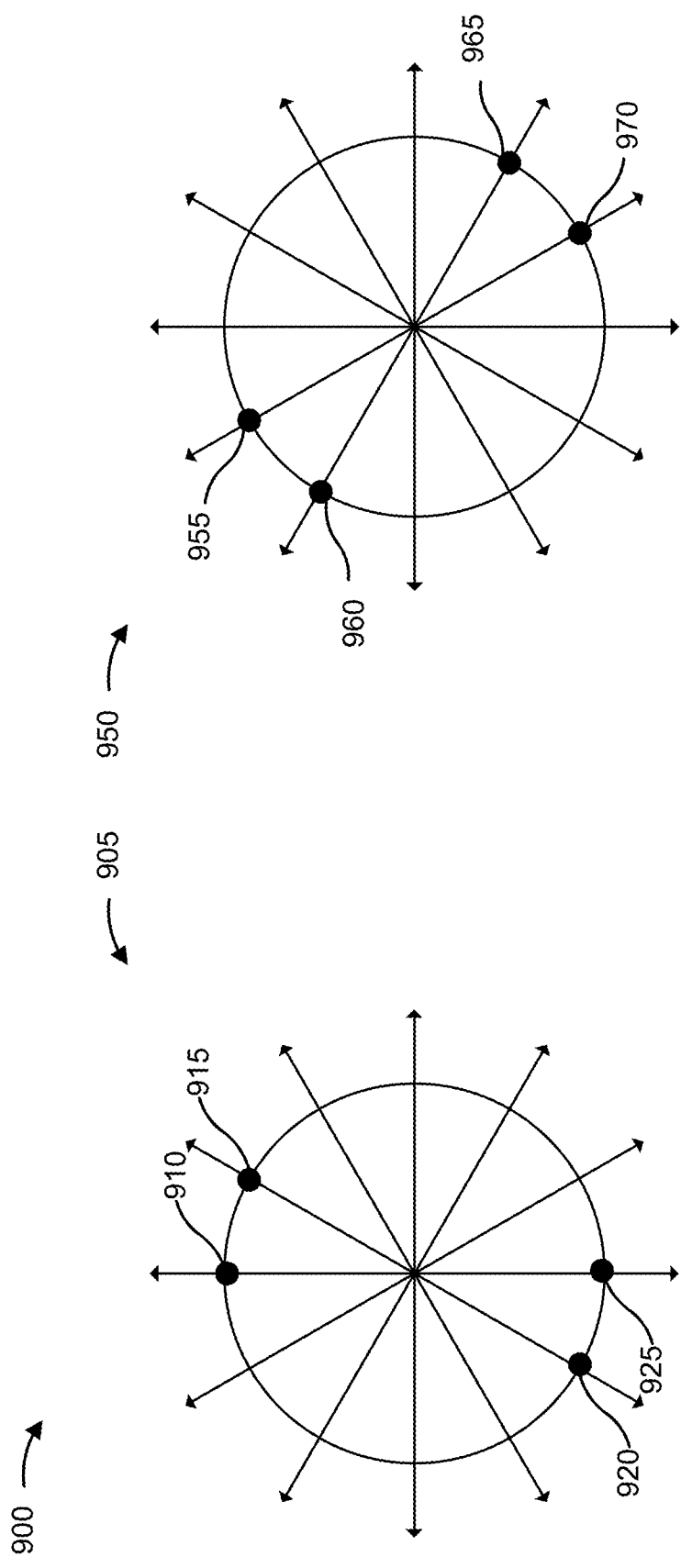
FIG. 9 is a diagram illustrating an example associated with uplink control information multiplexing, in accordance with the present disclosure.

FIG. 9 is a diagram illustrating an example 900 associated with uplink control information multiplexing, in accordance with the present disclosure. As shown in FIG. 9, a UE may generate a UCI message based at least in part on selecting a set of cyclic shift indices, of a set of candidate sets of cyclic shift indices (e.g., cyclic shift indices), to use for multiplexing a first UCI bit and a second UCI bit. The UE may indicate the scheduling request bit based at least in part on the selection of the set of cyclic shift indices. The UE may indicate a value of the first UCI bit based at least in part on a selected cyclic shift within the set of cyclic shift indices. In some aspects, the UCI message may include PUCCH format 0 message.

A first candidate set of cyclic shift indices 905 may include a set of 4 cyclic shift indices 910, 915, 920, and 925.

The cyclic shift index 910 may be at a first location and may indicate a first value of the first UCI bit and a first value of the second UCI bit (e.g., {0,0}). The cyclic shift index 915 may be at a second location and may indicate the first value of the first UCI bit and a second value of the second UCI bit (e.g., {0,1}). The cyclic shift index 920 may be at a third location and may indicate a second value of the first UCI bit and the first value of the second UCI bit (e.g., {1,0}). The cyclic shift index 925 may be at a fourth location and may indicate the second value of the first UCI bit and the second value of the second UCI bit (e.g., {1,1}). In some aspects, the cyclic shift index 910 may be grouped (e.g., by location) with the cyclic shift index 915 and the cyclic shift index 920 may be grouped with the fourth cyclic shift index 925 based at least in part on the first UCI bit having a priority that is higher than a priority of the second UCI bit. For example, a first distance from the first location to the second location may be less than a second distance from the first location to the third location and/or a third distance from the first location to the fourth location. In this way, a base station that receives the UCI message may determine a value of the first UCI bit with higher reliability based at least in part on determining that that cyclic shift is within a set of grouped cyclic shift indices. In some aspects, the cyclic shift indices may be grouped by cyclic shift indices that both indicate a same value for a higher priority bit. For example, the cyclic shift index 910 may be grouped with the cyclic shift index 915 based at least in part on the cyclic shift index 910 and the cyclic shift index 915 indicating a same value for the first UCI bit and based at least in part on a priority of the first UCI bit being higher than a priority of the second UCI bit.

Similarly, a second candidate set of cyclic shift indices 950 may include a set of 4 cyclic shift indices 955, 960, 965, and 970. The cyclic shift index 955 may be at a first location and may indicate the first value of the first UCI bit and the first value of the second UCI bit (e.g., {0,0}). The cyclic shift index 960 may be at a second location and may indicate the first value of the first UCI bit and the second value of the second UCI bit (e.g., {0,1}). The cyclic shift index 965 may be at a third location and may indicate the second value of the first UCI bit and the first value of the second UCI bit (e.g., {1,0}). The cyclic shift index 970 may be at a fourth location and may indicate the second value of the first UCI bit and the second value of the second UCI bit (e.g., {1,1}).

The UE may select a set of cyclic shift indices from the set of candidate cyclic shift indices that include the first candidate set of cyclic shift indices 905 and the second candidate set of cyclic shift indices 950. Selection of the first candidate set of cyclic shift indices 905 or the second candidate set of cyclic shift indices 905 may indicate the scheduling request bit. The UE may select a group of cyclic shift indices within the selected set of cyclic shift indices to indicate the first UCI bit and may select a cyclic shift index within the group of cyclic shift indices to indicate the second UCI bit. Alternatively, the UE may select a cyclic shift index within the set of cyclic shift indices to indicate both of the first UCI bit and the second UCI bit in a single selection operation.

As indicated above, FIG. 9 is provided as an example. Other examples may differ from what is described with regard to FIG. 9.

The following provides an overview of some aspects of the present disclosure:

Aspect 1: A method of wireless communication performed by a user equipment (UE), comprising: generating an uplink control information (UCI) message including a scheduling request bit multiplexed with a first UCI bit and a second UCI bit, including: selecting a set of sequences, of a set of candidate sets of sequences, to use for multiplexing the first UCI bit and the second UCI bit, the selection of the set of sequences indicating the scheduling request bit, and multiplexing the first UCI bit and the second UCI bit based at least in part on the set of sequences; and transmitting the UCI message.

Aspect 2: The method of aspect 1, further comprising: receiving an indication of the set of candidate sets of sequences from which the set of sequences is to be selected to indicate the scheduling request bit.

Aspect 3: The method of aspect 2, wherein the indication of the set of candidate sets of sequences includes an indication that selection of the set of sequences from the set of candidate sets of sequences indicates the scheduling request bit.

Aspect 4: The method of any of aspects 2 or 3, wherein the indication of the set of candidate sets of sequences includes an indication of a set of cyclic shifts to apply to a cell-specific base sequence to generate sequences of the set of candidate sets of sequences.

Aspect 5: The method of any of aspects 1 through or 4, wherein the set of candidate sets of sequences includes the set of sequences and an additional set of sequences, wherein the set of sequences is associated with a first candidate value of the scheduling request bit, and wherein the additional set of sequences is associated with a second candidate value of the scheduling request bit.

Aspect 6: The method any of aspects 1 through or 5, wherein the UCI message is a physical uplink control channel format 1 message.

Aspect 7: The method of any of aspects 1 through or 6, wherein the set of sequences includes a single sequence, and wherein multiplexing the scheduling request bit with the first UCI bit and the second UCI bit includes applying the single sequence to the first UCI bit and the second UCI bit.

Aspect 8: The method of aspect 7, wherein multiplexing the first UCI bit and the second UCI bit including applying the single sequence to the first UCI bit and the second UCI bit comprises: modulating, based at least in part on quadrature phase shift keying (QPSK), a symbol of two bits including the first UCI bit and the second UCI bit.

Aspect 9: The method of aspect 8, wherein modulating, based at least in part on QPSK, the symbol of two bits including the first UCI bit and the second UCI bit comprises: combining the second UCI bit, modulated based at least in part QPSK, with the single sequence on even OFDM symbols.

Aspect 10: The method of any of aspects 1 through 6, wherein the set of sequences includes a first sequence and a second sequence that is orthogonal to the first sequence, and wherein multiplexing the scheduling request bit with the first UCI bit and the second UCI bit includes applying the first sequence to the first UCI bit and applying the second sequence to the second UCI bit.

Aspect 11: The method of aspect 10, wherein the first sequence comprises a cell-specific base sequence having a first cyclic shift applied, and wherein the second sequence comprises the cell-specific base sequence having a second cyclic shift applied.

Aspect 12: The method of aspect 11, further comprising: receiving, from a base station, an indication of the first cyclic shift and the second cyclic shift.

Aspect 13: The method of aspect 10, wherein generating the UCI message including a scheduling request bit multiplexed with the first UCI bit and the second UCI bit comprises: superimposing the first UCI bit having the first sequence applied with the second UCI bit having the second sequence applied.

Aspect 14: The method of aspect 13, wherein the UCI message is configured to be received based at least in part on correlating the first sequence with the UCI message to extract the first UCI bit and correlating the second sequence with the UCI message to extract the second UCI bit.

Aspect 15: The method of aspect 10, wherein generating the UCI message including a scheduling request bit multiplexed with the first UCI bit and the second UCI bit comprises: applying a first weight to the first UCI bit having the first sequence applied and applying a second weight to the second UCI bit having the second sequence applied; and superimposing the first UCI bit having the first sequence applied, and with the first weight applied, with the second UCI bit having the second sequence applied, and with the second weight applied.

Aspect 16: The method of aspect 15, wherein the first weight is applied to the first UCI bit having the first sequence applied based at least in part on the first weight being greater than the second weight and based at least in part on the first UCI bit having a higher priority than a priority of the second UCI bit.

Aspect 17: The method of aspect 15, further comprising: receiving, from a base station, an indication to apply the first weight to the first UCI bit and to apply the second weight to the second UCI bit.

Aspect 18: The method of any of aspects 1 through 6, wherein multiplexing the scheduling request bit with the first UCI bit and the second UCI bit comprises: selecting a sequence, of the set of sequences, to apply to the second UCI bit, the selection of the sequence indicating the first UCI bit; and applying the sequence to the second UCI bit.

Aspect 19: The method of aspect 18, further comprising: receiving an indication that selection of the sequence from the set of sequences indicates the first UCI bit.

Aspect 20: The method of aspect 18, wherein the set of sequences includes the sequence and an additional sequence, wherein the sequence is associated with a first candidate value of the first UCI bit, and wherein the additional sequence is associated with a second candidate value of the first UCI bit.

Aspect 21: The method of aspect 18, wherein applying the sequence to the second UCI bit comprises: modulating, based at least in part on binary phase shift keying (BPSK), a symbol of one bit including the second UCI bit.

Aspect 22: The method of aspect 21, wherein modulating, based at least in part on BPSK, the symbol of one bit including the second UCI bit comprises: combining the second UCI bit, modulated based at least in part BPSK, with the sequence on even OFDM symbols.

Aspect 23: The method of any of aspects 1 through 22, wherein the first UCI bit has a priority that is higher than a priority of the second UCI bit.

Aspect 24: A method of wireless communication performed by a user equipment (UE), comprising: generating an uplink control information (UCI) message including a scheduling request bit multiplexed with a first UCI bit and a second UCI bit, including: selecting a set of cyclic shift indices, of a set of candidate sets of cyclic shift indices, to use for multiplexing the first UCI bit and the second UCI bit, the selection of the set of cyclic shift indices indicating the scheduling request bit, and selecting a cyclic shift index of the set of cyclic shift indices to indicate the first UCI bit and the second UCI bit; and transmitting the UCI message.

Aspect 25: The method of aspect 24, further comprising: receiving an indication of the set of candidate sets of cyclic shift indices from which the set of cyclic shift indices is to be selected to indicate the scheduling request bit.

Aspect 26: The method of aspect 25, wherein the indication of the set of candidate sets of cyclic shift indices includes an indication that selection of the set of cyclic shift indices from the set of candidate sets of cyclic shift indices indicates the scheduling request bit.

Aspect 27: The method of any of aspects 24 through 26, wherein the set of cyclic shift indices includes a first cyclic shift index, a second cyclic shift index, a third cyclic shift index, and a fourth cyclic shift index, wherein the first cyclic shift index is at a first location and indicates a first value of the first UCI bit and a first value of the second UCI bit, wherein the second cyclic shift index is at a second location and indicates the first value of the first UCI bit and a second value of the second UCI bit, wherein the third cyclic shift index is at a third location and indicates a second value of the first UCI bit and the first value of the second UCI bit, and wherein the fourth cyclic shift index is at a fourth location and indicates the second value of the first UCI bit and the second value of the second UCI bit.

Aspect 28: The method of aspect 27, wherein a first distance from the first location to the second location is less than a second distance from the first location to the third location, and wherein the first distance is less than a third distance from the first location to the fourth location.

Aspect 29: The method of any of aspects 24 through 28, wherein the UCI message is a physical uplink control channel format 0 message.

Aspect 30: The method of any of aspects 24 through 29, wherein the first UCI bit has a priority that is higher than a priority of the second UCI bit.

Aspect 31: An apparatus for wireless communication at a device, comprising a processor; memory coupled with the processor; and instructions stored in the memory and executable by the processor to cause the apparatus to perform the method of one or more aspects of aspects 1-30.

Aspect 32: A device for wireless communication, comprising a memory and one or more processors coupled to the memory, the one or more processors configured to perform the method of one or more aspects of aspects 1-30.

Aspect 33: An apparatus for wireless communication, comprising at least one means for performing the method of one or more aspects of aspects 1-30.

Aspect 34: A non-transitory computer-readable medium storing code for wireless communication, the code comprising instructions executable by a processor to perform the method of one or more aspects of aspects 1-30.

Aspect 35: A non-transitory computer-readable medium storing a set of instructions for wireless communication, the set of instructions comprising one or more instructions that, when executed by one or more processors of a device, cause the device to perform the method of one or more aspects of aspects 1-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors coupled to the one or more memories, the one or more processors configured to:

generate an uplink control information (UCI) message including a scheduling request bit multiplexed with a first UCI bit and a second UCI bit, including:
  selection of a set of sequences, of a set of candidate sets of sequences, to use for multiplexing the first UCI bit and the second UCI bit, the selection of the set of sequences indicating the scheduling request bit, wherein the set of sequences includes a first sequence and a second sequence that is orthogonal to the first sequence, and
  multiplexing of the first UCI bit and the second UCI bit based at least in part on the set of sequences by applying the first sequence to the first UCI bit and applying the second sequence to the second UCI bit;
  wherein the first UCI bit having the first sequence applied is superimposed with the second UCI bit having the second sequence applied; and
transmit the UCI message.

2. The UE of claim 1, wherein the one or more processors are further configured to:
  receive an indication of the set of candidate sets of sequences from which the set of sequences is to be selected to indicate the scheduling request bit.

3. The UE of claim 2, wherein the indication of the set of candidate sets of sequences includes an indication that selection of the set of sequences from the set of candidate sets of sequences indicates the scheduling request bit.

4. The UE of claim 2, wherein the indication of the set of candidate sets of sequences includes an indication of a set of cyclic shifts to apply to a cell-specific base sequence to generate sequences of the set of candidate sets of sequences.

5. The UE of claim 1, wherein the set of candidate sets of sequences includes the set of sequences and an additional set of sequences,
  wherein the set of sequences is associated with a first candidate value of the scheduling request bit, and
  wherein the additional set of sequences is associated with a second candidate value of the scheduling request bit.

6. The UE of claim 1, wherein the UCI message is a physical uplink control channel format 1 message.

7. The UE of claim 1, wherein the set of sequences includes a single sequence, and
  wherein the one or more processors, when multiplexing the scheduling request bit with the first UCI bit and the second UCI bit, are configured to apply the single sequence to the first UCI bit and the second UCI bit.

8. The UE of claim 7, wherein the one or more processors, when multiplexing the first UCI bit and the second UCI bit, are configured to:
  modulate, based at least in part on quadrature phase shift keying (QPSK), a symbol of two bits including the first UCI bit and the second UCI bit.

9. The UE of claim 8, wherein the one or more processors, when modulating, based at least in part on QPSK, the symbol of two bits, are configured to:
  combine the second UCI bit, modulated based at least in part QPSK, with the single sequence on even OFDM symbols.

10. The UE of claim 1, wherein the first sequence comprises a cell-specific base sequence having a first cyclic shift applied, and
  wherein the second sequence comprises the cell-specific base sequence having a second cyclic shift applied.

11. The UE of claim 1, wherein the one or more processors are further configured to:
  receive, from a base station, an indication of the first cyclic shift and the second cyclic shift.

12. The UE of claim 1, wherein the UCI message is configured to be received based at least in part on correlating the first sequence with the UCI message to extract the first UCI bit and correlating the second sequence with the UCI message to extract the second UCI bit.

13. The UE of claim 1, wherein the one or more processors, when generating the UCI message, are configured to:
  apply a first weight to the first UCI bit having the first sequence applied and apply a second weight to the second UCI bit having the second sequence applied; and
  wherein the first UCI bit having the first sequence applied, and with the first weight applied, is superimposed with the second UCI bit having the second sequence applied, and with the second weight applied.

14. The UE of claim 13, wherein the first weight is applied to the first UCI bit having the first sequence applied based at least in part on the first weight being greater than the second weight and based at least in part on the first UCI bit having a higher priority than a priority of the second UCI bit.

15. The UE of claim 13, wherein the one or more processors are further configured to:
  receive, from a base station, an indication to apply the first weight to the first UCI bit and to apply the second weight to the second UCI bit.

16. The UE of claim 1, wherein a selection of the second sequence indicates the first UCI bit, and wherein the one or more processors, when multiplexing the scheduling request bit with the first UCI bit and the second UCI bit, are configured to:
  apply the second sequence to the second UCI bit.

17. The UE of claim 16, wherein the one or more processors are further configured to:
  receive an indication that selection of the second sequence from the set of sequences indicates the first UCI bit.

18. The UE of claim 16, wherein the set of sequences includes the sequence and an additional sequence,
  wherein the second sequence is associated with a first candidate value of the first UCI bit, and
  wherein the additional sequence is associated with a second candidate value of the first UCI bit.

19. The UE of claim 16, wherein the one or more processors, when applying the sequence to the second UCI bit, are configured to:
  modulate, based at least in part on binary phase shift keying (BPSK), a symbol of one bit including the second UCI bit.

20. The UE of claim 19, wherein the one or more processors, when modulating, based at least in part on BPSK, the symbol of one bit, are configured to:
  combine the second UCI bit, modulated based at least in part BPSK, with the second sequence on even OFDM symbols.

21. The UE of claim 1, wherein the first UCI bit has a priority that is higher than a priority of the second UCI bit.

22. A UE for wireless communication, comprising:
  one or more memories; and
  one or more processors coupled to the one or more memories, the one or more processors configured to:
    generate an uplink control information (UCI) message including a scheduling request bit multiplexed with a first UCI bit and a second UCI bit, including:
      select a set of cyclic shift indices, of a set of candidate sets of cyclic shift indices, to use for multiplexing the first UCI bit and the second UCI bit, the selection of the set of cyclic shift indices indicating the scheduling request bit, and select a cyclic shift index of the set of cyclic shift indices to indicate the first UCI bit and the second UCI bit; and transmit the UCI message;

wherein the set of cyclic shift indices includes a first cyclic shift index, a second cyclic shift index, a third cyclic shift index, and a fourth cyclic shift index, wherein the first cyclic shift index is at a first location and indicates a first value of the first UCI bit and a first value of the second UCI bit, wherein the second cyclic shift index is at a second location and indicates the first value of the first UCI bit and a second value of the second UCI bit, wherein the third cyclic shift index is at a third location and indicates a second value of the first UCI bit and the first value of the second UCI bit, wherein the fourth cyclic shift index is at a fourth location and indicates the second value of the first UCI bit and the second value of the second UCI bit, wherein a first distance from the first location to the second location is less than a second distance from the first location to the third location, and wherein the first distance is less than a third distance from the first location to the fourth location.

23. The UE of claim 22, wherein the one or more processors are further configured to:

receive an indication of the set of candidate sets of cyclic shift indices from which the set of cyclic shift indices is to be selected to indicate the scheduling request bit.

24. The UE of claim 23, wherein the indication of the set of candidate sets of cyclic shift indices includes an indication that selection of the set of cyclic shift indices from the set of candidate sets of cyclic shift indices indicates the scheduling request bit.

25. The UE of claim 22, wherein the UCI message is a physical uplink control channel format 0 message.

26. The UE of claim 22, wherein the first UCI bit has a priority that is higher than a priority of the second UCI bit.

27. A method of wireless communication performed by a user equipment (UE), comprising:

generating an uplink control information (UCI) message including a scheduling request bit multiplexed with a first UCI bit and a second UCI bit, including:

selecting a set of sequences, of a set of candidate sets of sequences, to use for multiplexing the first UCI bit and the second UCI bit, the selection of the set of sequences indicating the scheduling request bit, wherein the set of sequences includes a first sequence and a second sequence that is orthogonal to the first sequence, and multiplexing the first UCI bit and the second UCI bit based at least in part on the set of sequences by applying the first sequence to the first UCI bit and applying the second sequence to the second UCI bit;

wherein the first UCI bit having the first sequence applied is superimposed with the second UCI bit having the second sequence applied; and transmitting the UCI message.

28. A method of wireless communication performed by a user equipment (UE), comprising:

generating an uplink control information (UCI) message including a scheduling request bit multiplexed with a first UCI bit and a second UCI bit, including:

selecting a set of cyclic shift indices, of a set of candidate sets of cyclic shift indices, to use for multiplexing the first UCI bit and the second UCI bit, the selection of the set of cyclic shift indices indicating the scheduling request bit, and selecting a cyclic shift index of the set of cyclic shift indices to indicate the first UCI bit and the second UCI bit; and transmitting the UCI message;

wherein the set of cyclic shift indices includes a first cyclic shift index, a second cyclic shift index, a third cyclic shift index, and a fourth cyclic shift index, wherein the first cyclic shift index is at a first location and indicates a first value of the first UCI bit and a first value of the second UCI bit, wherein the second cyclic shift index is at a second location and indicates the first value of the first UCI bit and a second value of the second UCI bit, wherein the third cyclic shift index is at a third location and indicates a second value of the first UCI bit and the first value of the second UCI bit, wherein the fourth cyclic shift index is at a fourth location and indicates the second value of the first UCI bit and the second value of the second UCI bit, wherein a first distance from the first location to the second location is less than a second distance from the first location to the third location, and wherein the first distance is less than a third distance from the first location to the fourth location.

* * * * *